(12) United States Patent
Hsu

(10) Patent No.: US 7,290,780 B2
(45) Date of Patent: Nov. 6, 2007

(54) FOLDING BICYCLE

(76) Inventor: Yu-Tu Hsu, No. 245, Guangming Rd., Da-Jea Township, Taichung County (TW)

( * ) Notice: Subject to any disclaimer, the term of this patent is extended or adjusted under 35 U.S.C. 154(b) by 228 days.

(21) Appl. No.: 11/226,530

(22) Filed: Sep. 13, 2005

(65) Prior Publication Data

US 2007/0057482 A1    Mar. 15, 2007

(51) Int. Cl.
*B62K 17/00*    (2006.01)

(52) U.S. Cl. ........................ 280/287; 280/278

(58) Field of Classification Search ............... 280/287, 280/278, 87.05, 638, 639
See application file for complete search history.

(56) References Cited

U.S. PATENT DOCUMENTS

| | | | | |
|---|---|---|---|---|
| 3,419,283 A * | 12/1968 | Newland | ..................... | 280/278 |
| 4,653,767 A * | 3/1987 | Gajewski | ..................... | 280/278 |
| 4,718,688 A * | 1/1988 | Sanders | ..................... | 280/278 |
| 4,844,494 A * | 7/1989 | Blanchard | ..................... | 280/278 |
| 4,895,386 A * | 1/1990 | Hellestam et al. | .......... | 280/287 |
| 6,032,971 A * | 3/2000 | Herder | ..................... | 280/278 |
| 6,595,536 B1 * | 7/2003 | Tucker | ..................... | 280/278 |
| 6,883,817 B2 * | 4/2005 | Chu | ..................... | 280/278 |
| 7,055,842 B1 * | 6/2006 | Lin | ..................... | 280/278 |
| 2003/0114274 A1 * | 6/2003 | Chang et al. | ................. | 482/57 |
| 2005/0230933 A1 * | 10/2005 | Woo | ..................... | 280/278 |
| 2007/0018422 A1 * | 1/2007 | Pan | ..................... | 280/287 |
| 2007/0024023 A1 * | 2/2007 | Hsu | ..................... | 280/287 |

* cited by examiner

*Primary Examiner*—Tony Winner
(74) *Attorney, Agent, or Firm*—Pro-Techtor Int'l Services

(57) ABSTRACT

A folding bicycle comprises a support assembly pivotably connected to a portion of a head tube below a lower enlargement above a front wheel; and a rear wheel assembly comprising a front end pivotably connected to a quick release slidable along the head tube, an intermediate enhancement including a padded cross bar interconnected its right and left portions, an intermediate point pivotably connected to an intermediate point of the support assembly, and two auxiliary wheels fixedly connected to both ends of a hub of a rear wheel as kickstand. Unfastening and sliding the quick release the quick release upward until being stopped by a stop fixedly connected to handlebars, and fastening the quick release will fold the bicycle. Alternatively, unfastening and sliding the quick release downward until being stopped by the enlargement, and fastening the quick release will unfold the bicycle.

3 Claims, 5 Drawing Sheets

FOLDING BICYCLE

BACKGROUND OF THE INVENTION

1. Field of Invention

The present invention relates to folding bicycles and more particularly to such a folding bicycle with improved characteristics including enhanced structural strength and two small auxiliary wheels in the rear served as kickstand.

2. Related Art

Folding bicycles are well known. Conventionally, folding bicycles are relatively complex in constructions, costly to manufacture, trouble-prone, and unreliable in use. Moreover, no kickstand is provided. Thus, it is impossible of holding a stationary bicycle upright (i.e., in a storage or non-operating position of the bicycle). Thus, a need for improvement exists.

SUMMARY OF THE INVENTION

It is therefore an object of the present invention to provide a folding bicycle comprising a drive mechanism comprising two pedals; a front wheel assembly comprising a front wheel, a pivotal head tube, a first quick release slidably mounted on the head tube, an enlargement mounted on the head tube below the first quick release, a stop mounted on a top of the head tube, and a pair of handlebars fixedly connected to the stop; a support assembly comprising a front first pivot pivotably connected to a portion of the head tube below the enlargement and above the front wheel, and a rear seat tube; a rear wheel assembly comprising a rear wheel, a front second pivot pivotably connected to the first quick release, an intermediate enhancement including a right portion, a left portion, a padded cross bar interconnected the right and the left portions, an intermediate third pivot pivotably connected to an intermediate point of the support assembly, and two auxiliary wheels fixedly connected to both ends of a hub of the rear wheel; and a seat assembly comprising a spring biased seat, a downward seat post extended from the seat and being slidable in the seat tube, and a second quick release formed below the seat for securing the seat tube to the seat post; whereby unfastening the first quick release, sliding the first quick release upward until being stopped by the stop, and fastening the first quick release will fold the bicycle, and unfastening the first quick release, sliding the first quick release downward until being stopped by the enlargement, and fastening the first quick release will unfold the bicycle.

In one aspect of the present invention, the auxiliary wheels are in contact with a supporting surface when the bicycle is fully unfolded.

In another aspect of the present invention, a bottom of an intermediate portion of the support assembly is either disengaged with the cross bar when the bicycle is folded or engaged therewith when the bicycle is unfolded.

The above and other objects, features and advantages of the present invention will become apparent from the following detailed description taken with the accompanying drawings.

DETAILED DESCRIPTION OF THE INVENTION

Figure 1:
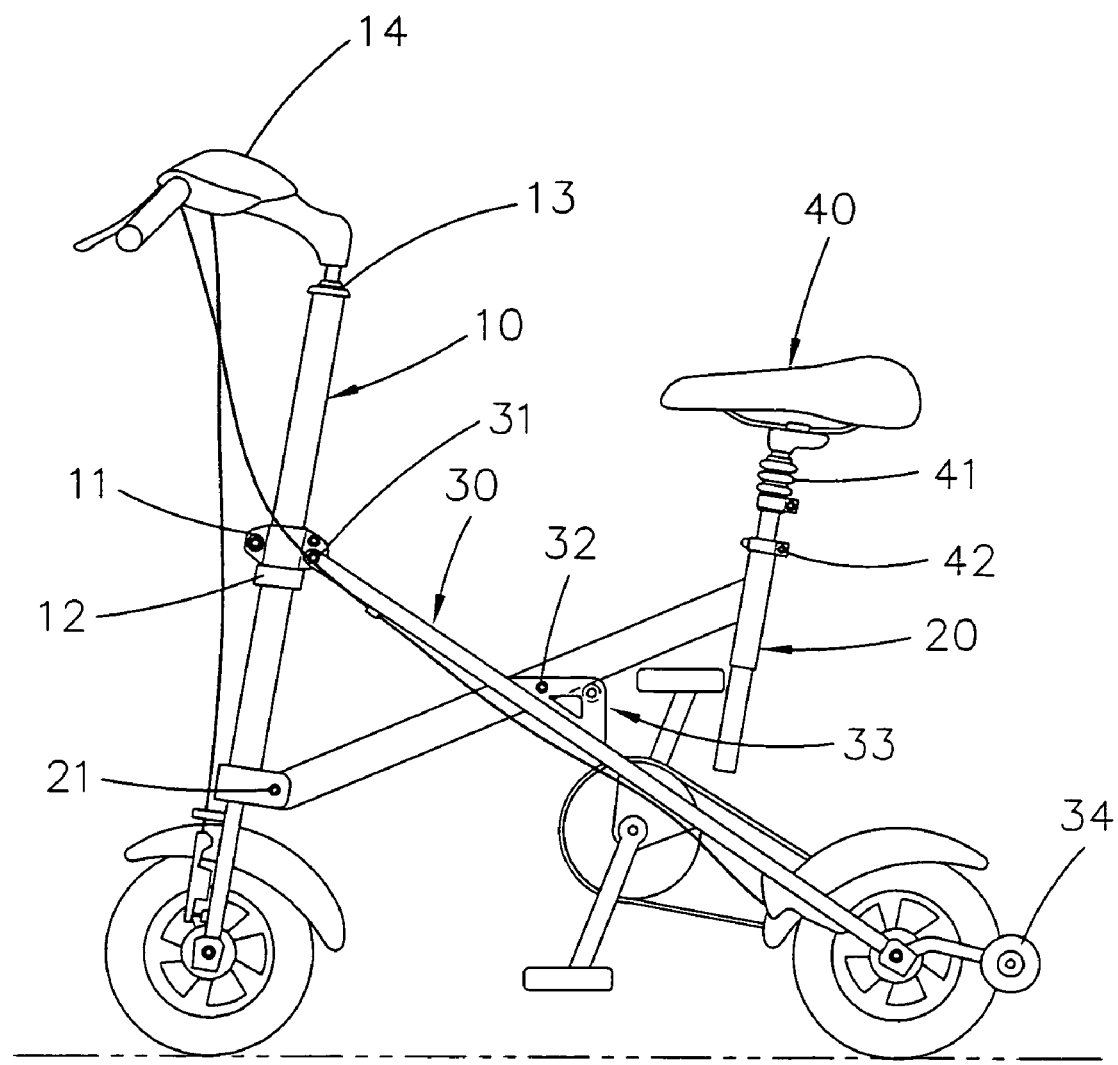
FIG. 1 is a side view of a preferred embodiment of folding bicycle according to the invention where the bicycle is unfolded to be ready to ride.

Referring to FIGS. 1 to 6, a folding bicycle in accordance with a preferred embodiment of the invention comprises a front wheel assembly 10, a support assembly 20, a rear wheel assembly 30, and a seat assembly 40. Each component is discussed in detailed below.

The front wheel assembly 10 comprises a ring-shaped quick release 11 slidably mounted on a pivotal head tube, the quick release 11 including a pivot 111, a lower enlargement 12 mounted on the head tube, a stop 13 mounted on a top of the head tube, and a pair of handlebars 14 fixedly connected to the stop 13.

The support assembly 20 comprises a front point 21 pivotably connected to a portion of the head tube below the enlargement 12 and above the front wheel and has its rear formed as a seat tube. The rear wheel assembly 30 comprises a front point 31 pivotably connected to the pivot 111 of the quick release 11, an enhancement 33 in its intermediate portion, the enhancement 33 including a cross bar 331 interconnected right and left portions of the enhancement 33, and a pad 332 formed around the cross bar 331, an intermediate point 32 pivotably connected to an intermediate point of the support assembly 20 (i.e., the support assembly 20 and the rear wheel assembly 30 formed as an X-shaped member), and two small auxiliary wheels 34 fixedly connected to both ends of the hub of rear wheel and being served as kickstand when the bicycle is fully unfolded (see FIG. 2) such that it is possible of holding a stationary bicycle upright in a storage or non-operating position of the bicycle. Also, the provision of the pad 332 can lessen the effect of shocks and jarring when the bicycle is fully unfolded with bottom of the support assembly 20 rested upon the pad 332 (see FIGS. 1, 5, and 6). Moreover, the provision of the enhancement 3 can increase the structural strength of the bicycle and thus prolong a useful life thereof.

The seat assembly 40 comprises a spring 41 below its seat for absorbing shock while riding, and a ring-shaped quick release 42 formed below the spring 41 for securing a seat post to the seat tube after a desire height of the seat has been adjusted by sliding the seat post in the seat tube.

Figure 2:
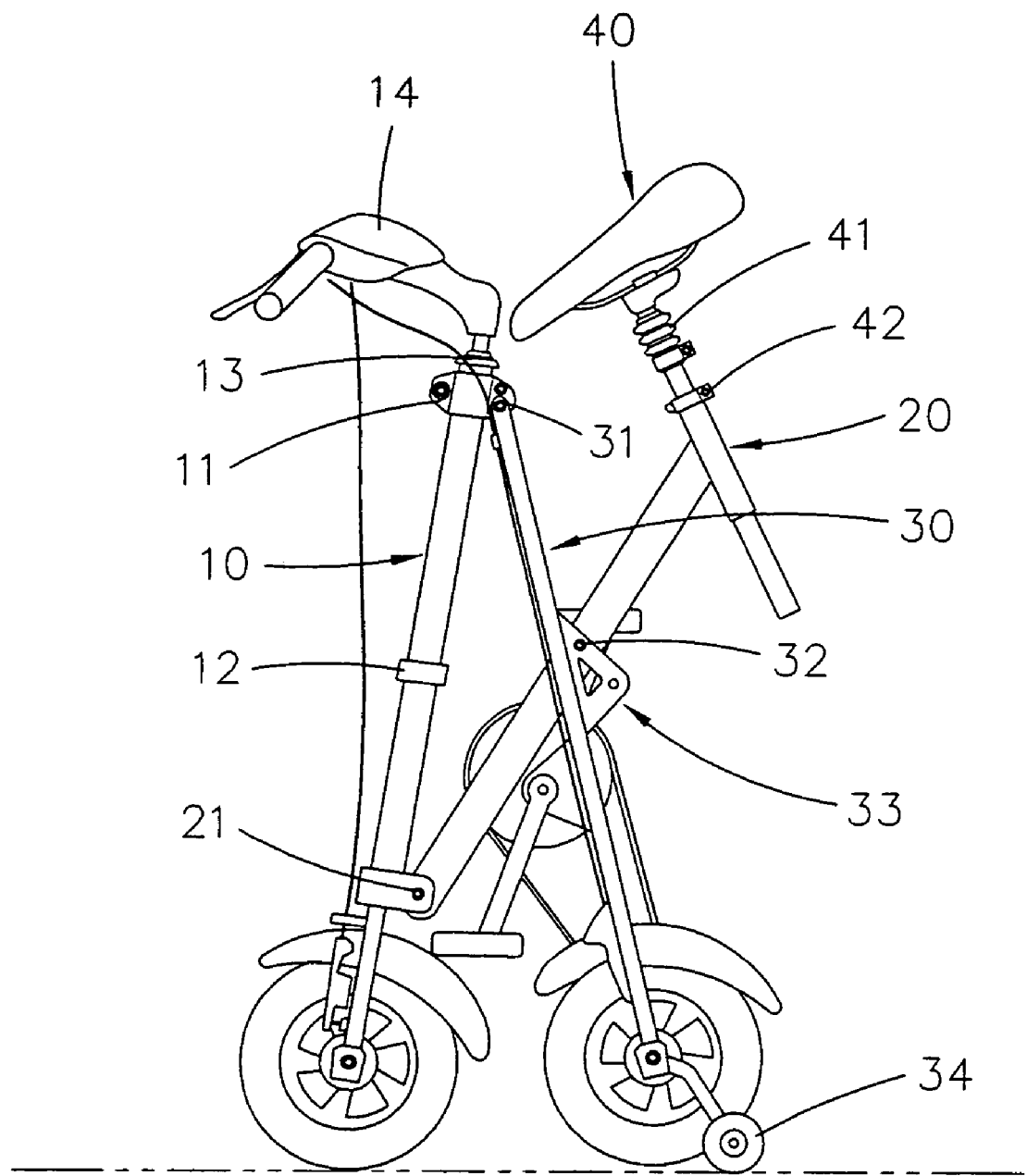
FIG. 2 is a view similar to FIG. 1 where the bicycle is folded to be ready to store or in a non-operating position.
Figure 3:
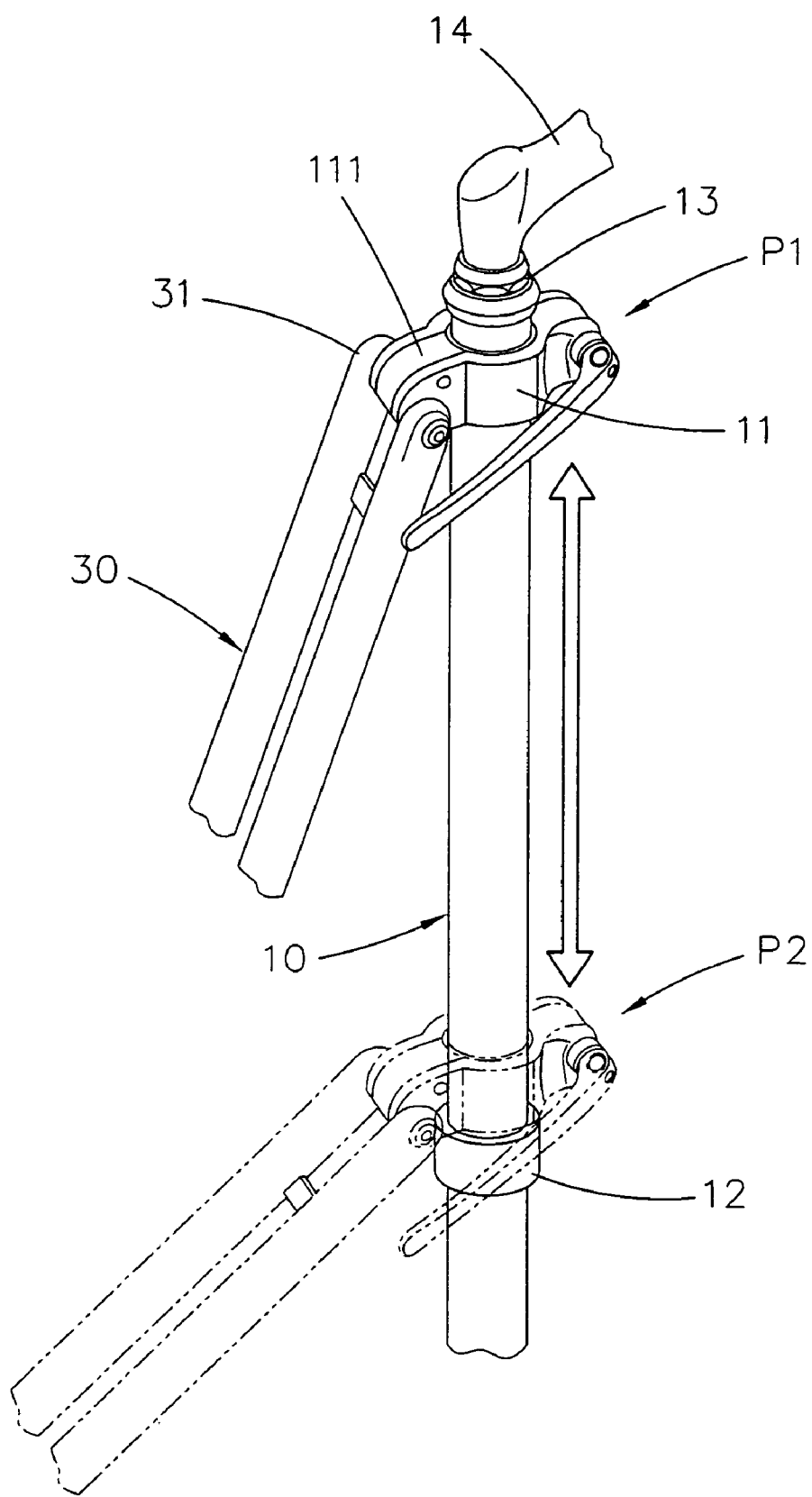
FIG. 3 is a perspective view showing sliding down or up operation of a quick release along head tube.
Figure 4:
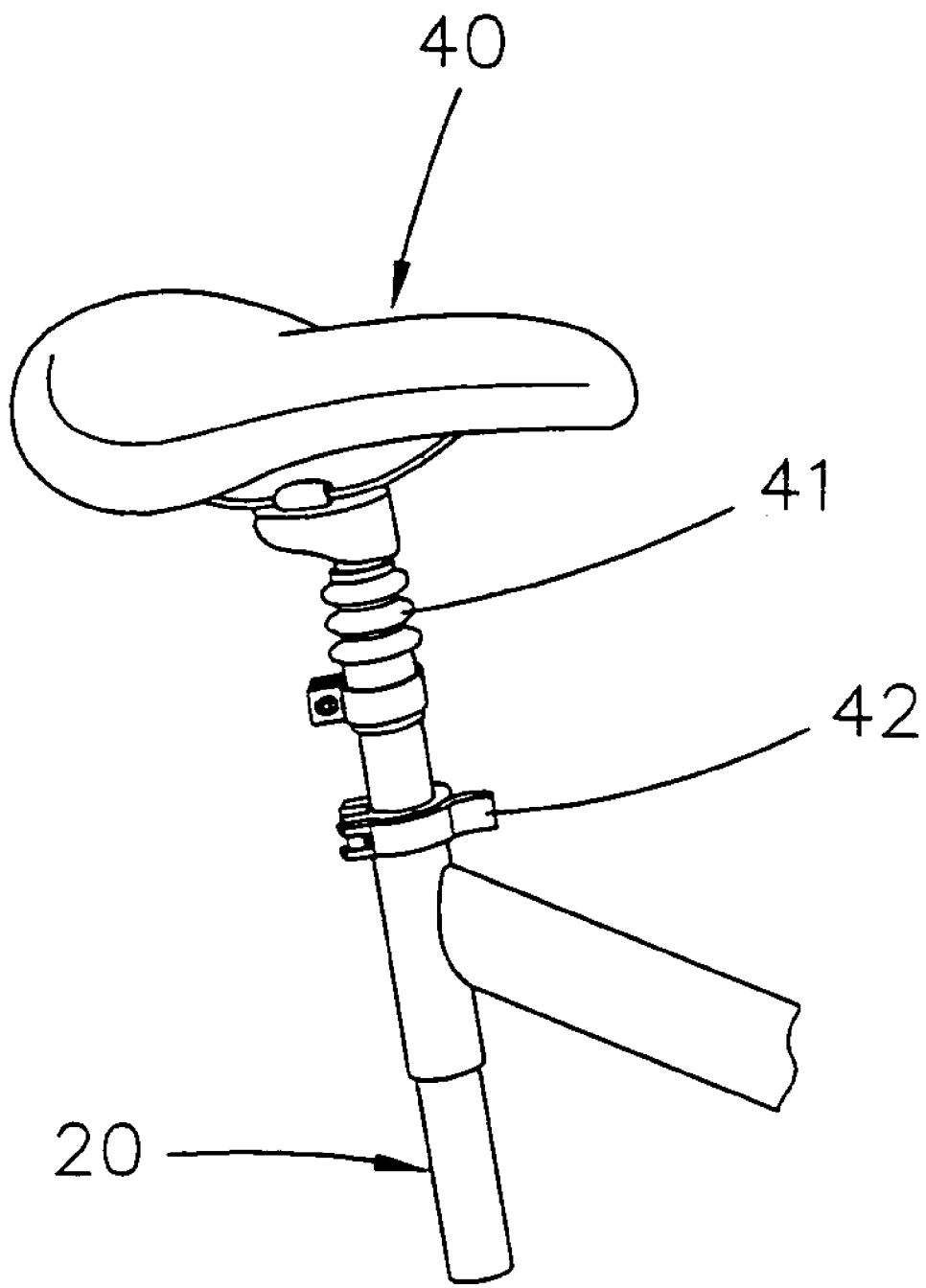
FIG. 4 is a perspective view of a seat assembly mounted on top of a seat post.
Figure 5:
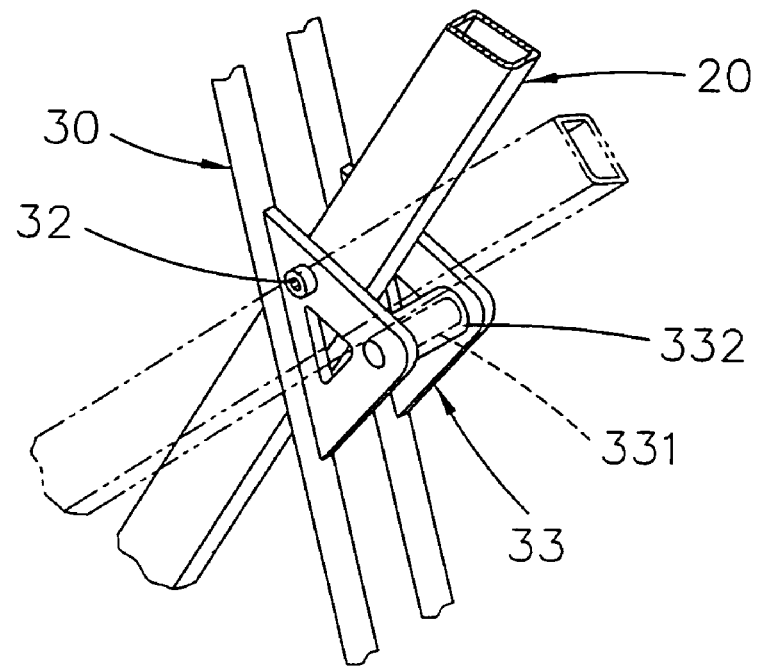
FIG. 5 is a perspective view of a pivot interconnected support assembly and rear wheel assembly and an enhancement of the rear wheel assembly with the pivot formed thereon.
Figure 6:
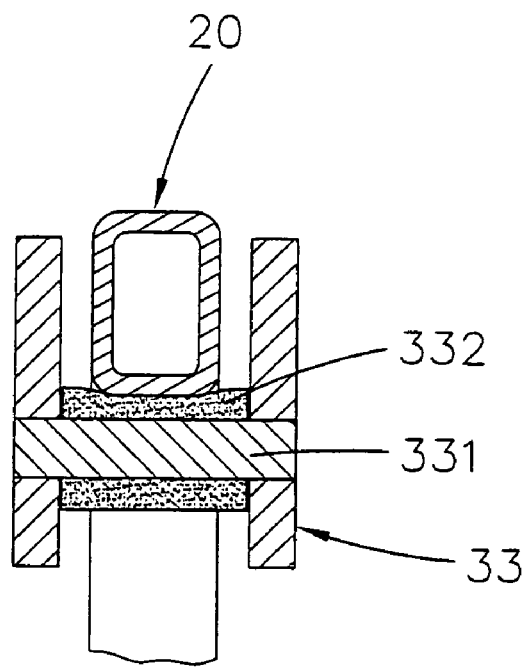
FIG. 6 is a sectional view of FIG. 5.

Referring to FIGS. 1, 2, and 3 specifically, for folding the bicycle a rider may first unfasten the quick release 11, then slide the quick release 11 upward until being stopped by the stop 13 (i.e., upward arrow from position P2 to position P1), and finally fasten the quick release 11. To the contrary, for unfolding the bicycle a rider may first unfasten the quick release 11, then slide the quick release 11 downward until being stopped by the enlargement 12 (i.e., downward arrow from position P1 to position P2), and finally fasten the quick release 11. Note, the intermediate portion of the support assembly 20 is not engaged with the cross bar 331 in the folded state of the bicycle (see FIG. 2).

While the invention herein disclosed has been described by means of specific embodiments, numerous modifications and variations could be made thereto by those skilled in the art without departing from the scope and spirit of the invention set forth in the claims.

What is claimed is:

1. A folding bicycle comprising:
   a drive mechanism comprising two pedals;
   a front wheel assembly comprising a front wheel, a pivotal head tube, a first quick release slidably mounted on the head tube, an enlargement mounted on the head tube below the first quick release, a stop mounted on a top of the head tube, and a pair of handlebars fixedly connected to the stop;
   a support assembly comprising a front first pivot pivotably connected to a portion of the head tube below the enlargement and above the front wheel, and a rear seat tube;
   a rear wheel assembly comprising a rear wheel, a front second pivot pivotably connected to the first quick release, an intermediate enhancement including a right portion, a left portion, a padded cross bar interconnected the right and the left portions, an intermediate third pivot pivotably connected to an intermediate point of the support assembly, and two auxiliary wheels fixedly connected to both ends of a hub of the rear wheel; and
   a seat assembly comprising a spring biased seat, a downward seat post extended from the seat and being slidable in the seat tube, and a second quick release formed below the seat for securing the seat tube to the seat post;
   whereby unfastening the first quick release, sliding the first quick release upward until being stopped by the stop, and fastening the first quick release will fold the bicycle, and unfastening the first quick release, sliding the first quick release downward until being stopped by the enlargement, and fastening the first quick release will unfold the bicycle.

2. The folding bicycle of claim 1, wherein the auxiliary wheels are in contact with a supporting surface when the bicycle is fully unfolded.

3. The folding bicycle of claim 1, wherein a bottom of an intermediate portion of the support assembly is either disengaged with the cross bar when the bicycle is folded or engaged therewith when the bicycle is unfolded.

* * * * *